United States Patent

Eiband et al.

[11] Patent Number: 5,240,207
[45] Date of Patent: Aug. 31, 1993

[54] GENERIC DRONE CONTROL SYSTEM

[75] Inventors: David M. Eiband; Lynn R. Kern, both of Ridgecrest, Calif.

[73] Assignee: The United States of America as represented by the Secretary of the Navy, Washington, D.C.

[21] Appl. No.: 923,867

[22] Filed: Aug. 3, 1992

[51] Int. Cl.⁵ .................. B64C 13/20; G06F 15/50
[52] U.S. Cl. .................. 244/190; 364/424.02; 434/35; 434/44
[58] Field of Search .................. 244/190; 364/424.02, 364/424.04; 434/32, 35, 38, 40, 44

[56] References Cited

U.S. PATENT DOCUMENTS

| | | | |
|---|---|---|---|
| 3,564,134 | 2/1971 | Rue | 244/190 |
| 4,028,725 | 6/1977 | Lewis | 358/109 |
| 4,386,914 | 6/1983 | Dustman | 244/190 |
| 4,405,943 | 9/1983 | Kanaly | 358/109 |
| 4,855,822 | 8/1989 | Narendra et al. | 364/424.02 |
| 5,014,187 | 5/1991 | Lord | 244/190 |

Primary Examiner—Michael S. Huppert
Assistant Examiner—Virna Lissi Ansley
Attorney, Agent, or Firm—Robert J. Hampsch; Melvin J. Sliwka; John L. Forrest, Jr.

[57] ABSTRACT

The disclosed invention is a generic Drone Control System or alternatively a method to remotely pilot an air vehicle. The present invention essentially comprises a converted aircraft or other air vehicle and a ground station from where the drone is remotely controlled. Also disclosed as part of the Drone Control System are a plurality of means to transfer information and data between the ground station and the drone.

7 Claims, 5 Drawing Sheets

GENERIC DRONE CONTROL SYSTEM

BACKGROUND OF THE INVENTION

The present invention relates to a Drone Control System, and more particularly, a method to remotely pilot an air vehicle. A drone is a pilotless aircraft operated by remote control. Drones are used in many military applications as aerial targets and for other purposes such as reconnaissance.

The present invention is a remotely piloted aircraft, or drone, that was originally designed to be an operable aircraft and accommodate a pilot as necessary. The related art of drone design and development has typically adopted two distinct approaches. The first approach, similar to the present invention, is to convert an existing aircraft into a drone. Traditional aircraft to drone conversions have required extensive modifications to the existing aircraft. The development of additional and unique hardware and software systems, both on the aircraft and in a ground station are often required. Further, many aircraft to drone conversions also require the development of new or modified aircraft control laws. These controls laws, or algorithms, are part of the additional hardware/software systems on board the drone and are used to govern the drone operations. Due primarily to the aforementioned modifications, aircraft to drone conversions often become expensive and technically complex. For this reason, each aircraft to drone conversion has typically been a relatively unique development effort. There have been no generic drone conversion kits that could be simply used on multiple types of aircraft. Likewise, once an aircraft has been converted to a drone using conventional methods, it is impracticle and cost prohibitive to convert the drone back to an operable aircraft due to the fact that the modifications were so extensive. That is to say, there are no known removable and transferrable aircraft to drone conversion packages which would simplify the conversion process.

The second approach to the design and development of drones is to design and manufacture the drone from scratch. These vehicles are thus not designed for a pilot on board the vehicle. These vehicles are commonly known as Remotely Piloted Vehicles (RPVs), and Unmanned Air Vehicles (UAVs). Both UAVs and RPVs are vehicles which are originally designed without a pilot on board.

The typical drone system consists of an airborne vehicle, or airborne system, in combination with a ground station. The ground station is adapted to provide positive control of the drone throughout the flight envelope of the air vehicle. In addition, appropriate electrical or mechanical devices are also controlled through the ground station. These electrical/mechanical devices are used to actuate things such as landing gear, wing flaps, slats, wheel brakes, speed brakes, nose wheel steering, and a variety of other electrical connections used for commanding the air vehicle.

As stated above, the present invention is a remotely piloted aircraft, or drone, that was originally designed to be an operable aircraft and accommodate a pilot as necessary. Of particular interest in the present invention, is the method of controlling the drone. The related technology concerning the method of controlling a remotely piloted aircraft typically employs a central command computer. The central command computers used in related technologies are physically located at the ground station which transmits digitally telemetered command signals to the remotely piloted aircraft thereby controlling the aircraft control equipment. The remotely piloted aircraft or other air vehicles can be adapted to process these signals to execute a preprogrammed flight plan. Alternatively, the central command computer can be adapted to interface with a pilot or other ground operator, thereby allowing the remotely piloted vehicle to execute real time commands.

Other methods known in the art of controlling remotely piloted vehicles involve the substitution of a voice recognition control signal with the normal digital telemetered control signal. Some of the aforementioned methods of controlling the remotely piloted vehicle also incorporate visual information transmitted from the remotely piloted vehicle to augment the controlling scenario.

The Drone Control System disclosed herein is designed to greatly simplify the technical complexity of aircraft to drone conversions, while at the same time significantly reducing the costs associated with the more traditional conversion approach. Further, the present invention provides a removable and transferable drone configuration that can be transferred to other aircraft types. It will minimize the technical complexity of the modifications to the existing aircraft that would be required; this in turn allows the aircraft to remain fully man-rated with no system or performance degradation. Lastly, development time for this Drone Control System is drastically reduced over the traditional approaches.

SUMMARY OF THE INVENTION

The Drone Control System of the present invention is essentially comprised of a ground station and an air vehicle. The air vehicle in the disclosed Drone Control System is an operable aircraft. The ground station in the present inventions includes a replicated cockpit of the operable aircraft with the identical controls as are found on the operable aircraft. Control movements at the ground station by the operator are translated from analog displacements to digital signals and telemetered to the drone aircraft. Digital telemetry signals are then used by simple mechanical actuators in the controls to exactly replicate the original control movement in the ground station. Drone aircraft response in the handling quantities are therefore exactly like those of the aircraft before droning; the only difference is the replacement of the pilot with a set of mechanical actuators. Attitude and performance information of the aircraft, or air vehicle, will be telemetered using a video link, rather than telemetered readings from the instrument themselves.

Accordingly, it is an object of this invention to provide a Drone Control System designed to remotely fly an aircraft originally designed to be flown with a pilot on board. The pilot is replaced with a set of mechanical actuators in the aircraft which are controlled from a ground station.

It is the further object of the invention to provide a drone aircraft control system which would be fully useful in and transferable to multiple platforms and one that requires no permanent modifications to the existing aircraft.

It is yet another object of the invention to provide a drone control system that transmits aircraft attitude and performance information from the drone to the ground station via telemetered video signals. Further, separate takeoff and landing visual pictures will also be transmitted via a secondary video telemetry link.

These and other objects of the invention will become apparent from consideration of the drawings and the detailed descriptions that follow.

DETAILED DESCRIPTION OF THE INVENTION

The present invention is a generic Drone Control System or alternatively a method to remotely pilot an air vehicle. The generic Drone Control System is a technically simple approach to the task of aircraft to drone conversions. The Drone Control System disclosed essentially comprises a converted aircraft or other air vehicle and a ground station from where the drone is remotely controlled. Also disclosed as part of the Drone Control System are a plurality of means to transfer information and data between the ground station and the drone.

Figure 1:
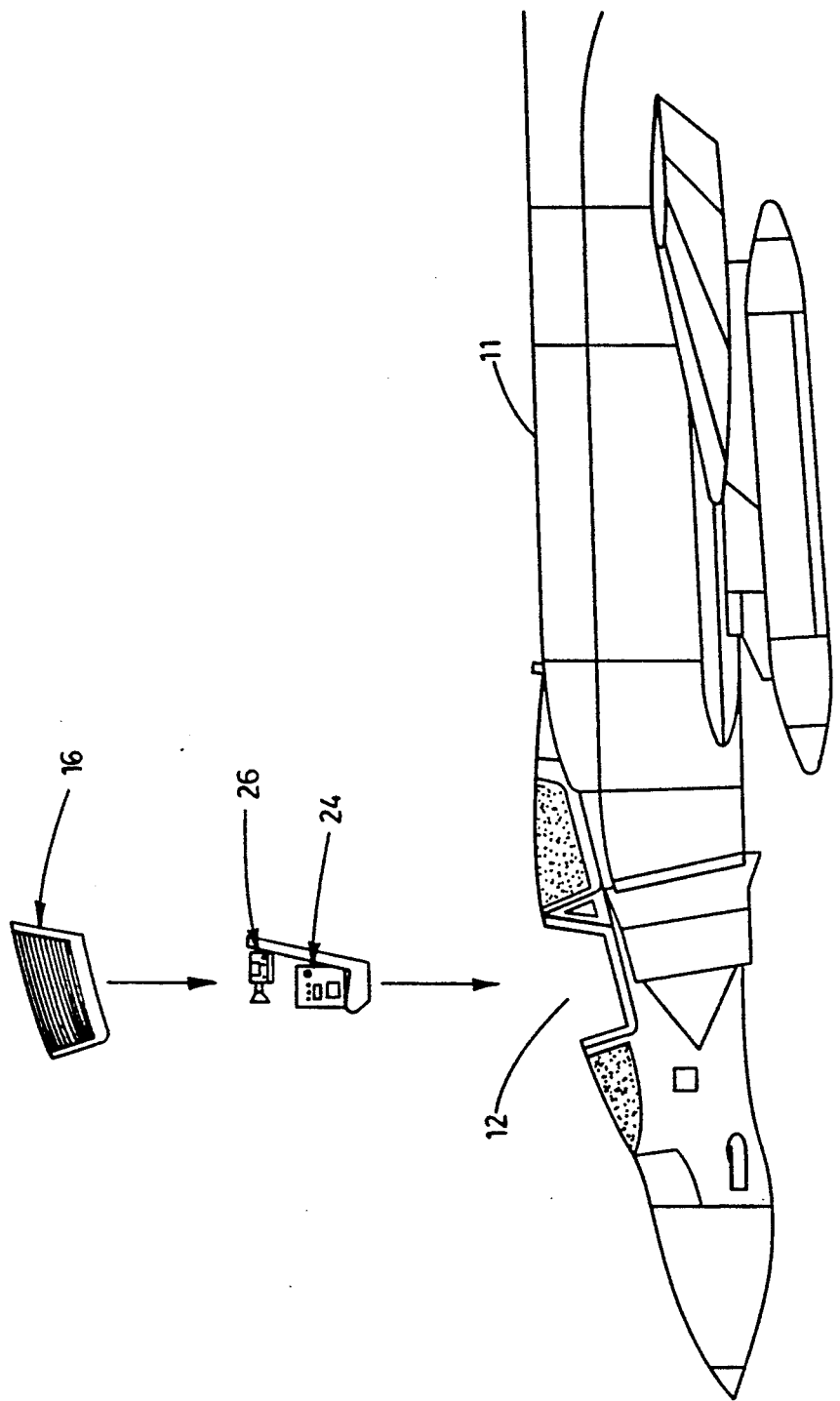
FIG. 1 shows the schematic of the air vehicle configuration including the darkened canopy of the present invention.
Figure 2:
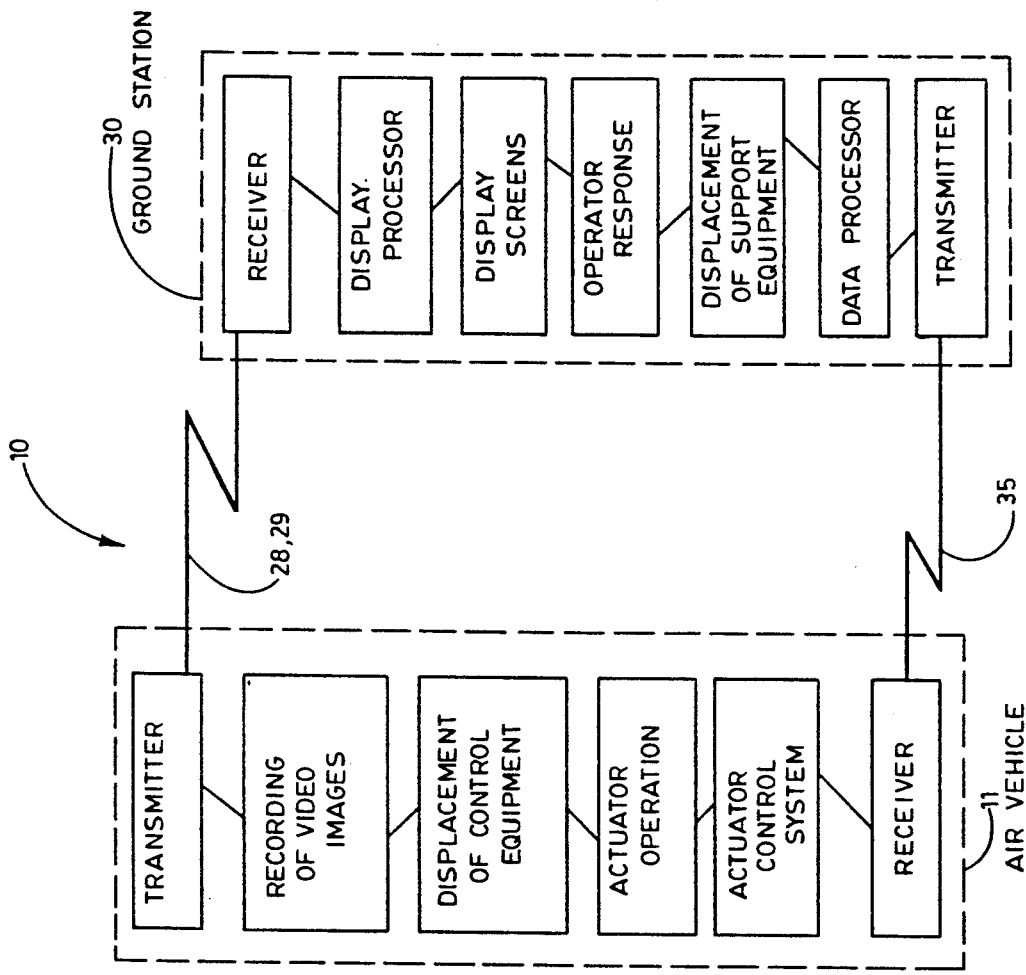
FIG. 2 shows the information flow between the aircraft and the ground station of the present invention.

Referring now to the drawings, FIG. 1, and FIG. 2 show the present invention comprising an aircraft or air vehicle (11), a ground station (30), a means for transferring information from the aircraft to the ground station, and a means for transferring information from the ground station to the aircraft. Specifically, the drone is converted from an operable air vehicle (11). The air vehicle (11) has a cockpit (12) containing operable control equipment (14) as seen in FIG. 3.

Figure 4:
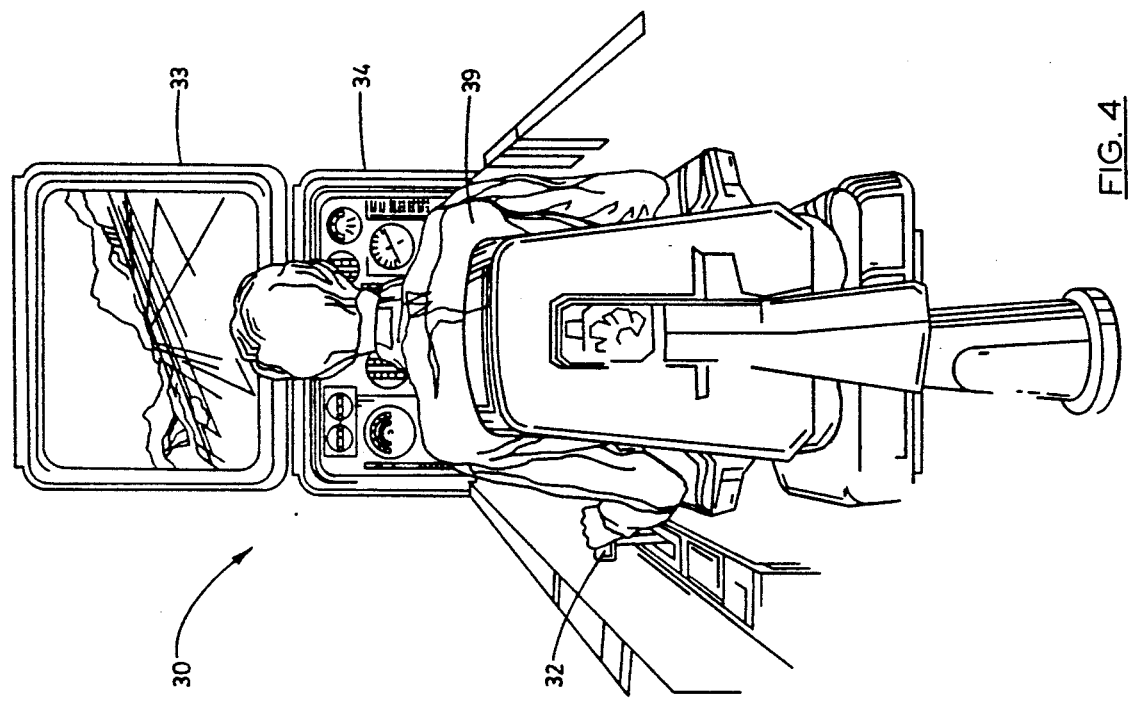
FIG. 4 depicts a view of the ground station and the support equipment of the present invention.
Figure 5:
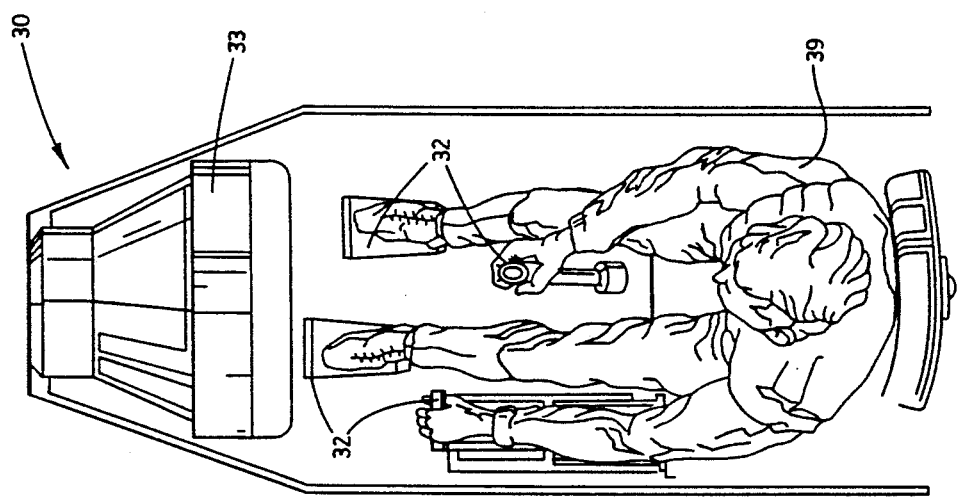
FIG. 5 presents a top view of the ground station and support equipment of the present invention.

FIG. 2, FIG. 4 and FIG. 5 illustrate the ground station (30) which comprises a replicated cockpit having support equipment (32) identical to the control equipment (14) in the cockpit of the operable air vehicle (11). The ground station (30) is adapted to accommodate an operator (39) or other means to command the drone. The ground station (30) further comprises a means to display visual image signals (28) obtained from the aircraft or air vehicle (11) to the operating means. This means to display the video image signals (28) preferably include multiple high resolution screens (34).

Figure 3:
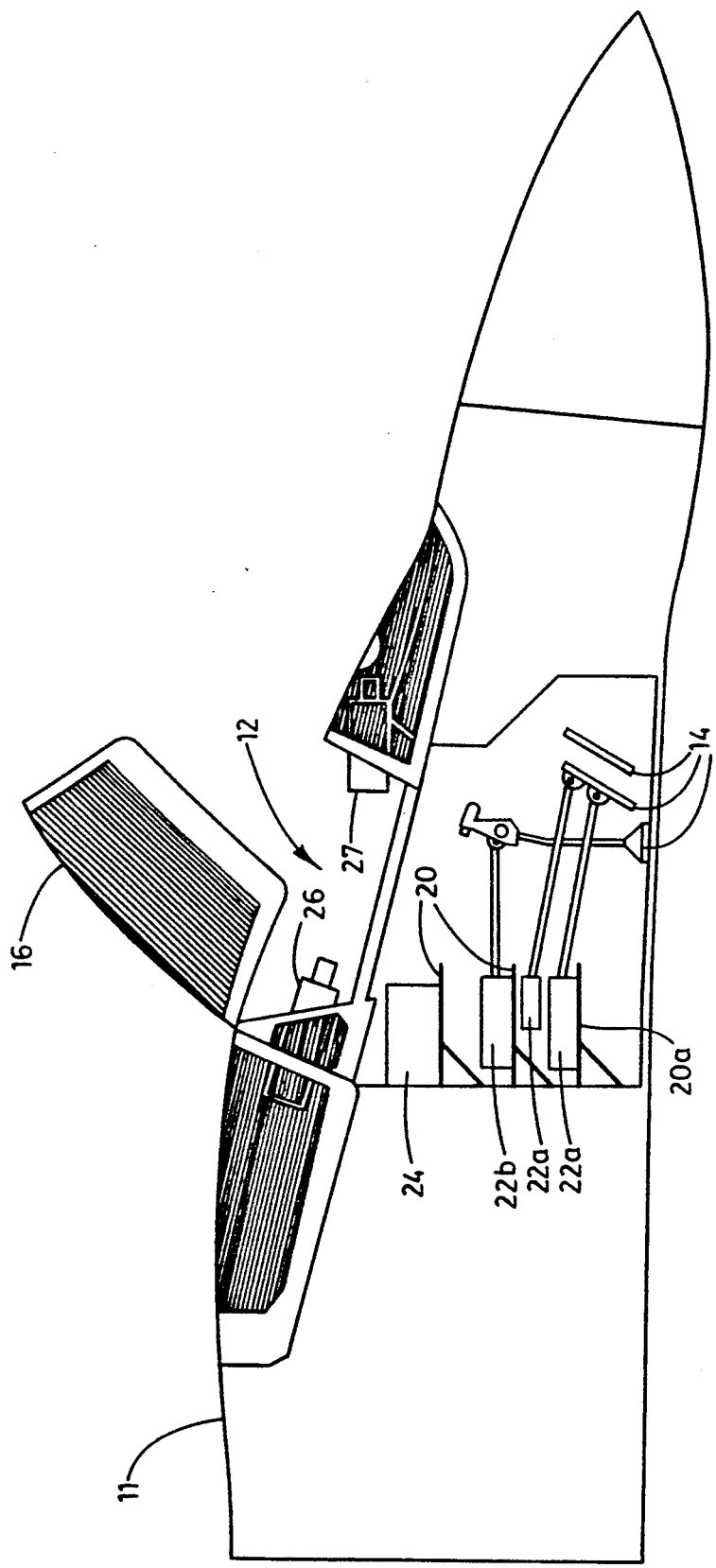
FIG. 3 illustrates the interior of the aircraft cockpit, the control equipment and the plurality of actuators of the present invention.

The means to transfer information from the air vehicle (11) to the ground station (30) is depicted in FIG. 2 and FIG. 3 and comprises a plurality of video cameras (26,27) for gathering video information both exterior of the aircraft cockpit (12) as well as the instruments (not shown) located in the interior of the cockpit (12). In addition, one or more transmitters operatively connected to the video cameras (26,27) are used to send the information collected from the video cameras (26,27) to the ground station (30). Further, a receiver and display processors are located at the ground station and adapted for receiving, processing and displaying the information transmitted from the aircraft.

The means to transfer information from the ground station (30) to the air vehicle (11) or aircraft comprises a transmitter, receiver, and processor. In the preferred embodiment, control movements at the ground station (30) are translated from analog displacements to digital flight command signals (35) and telemetered to the air vehicle (11). The telemetry flight command signals (35) are then used to operate the control equipment (14) on the air vehicle (11).

Because aircraft cockpits and controls are designed for certain human population size range, a generic set of actuators (22) are used which provide full range control actuation in any fighter or attack aircraft, in essence replacing the pilot. The generic Drone Control System (10) would therefore be, with the exception of several minor elements, fully useful in and transferable to many aircraft types. No permanent modifications to the existing aircraft would be required. This in turn, would allow the aircraft to remain fully man-rated with no system or performance degradation.

The telemetered flight command signals (35) from the ground station (30) are processed on the aircraft in order to control the mechanical actuators (22). The processing of the telemetered flight command signals (35) is done with an actuator control system (24) in a manner so that the mechanical actuators (22) exactly replicate the original controls movements of the support equipment (32) in the ground station (30). The drone aircraft response and handling qualities are therefore exactly like those of this aircraft before droning. The primary difference is the replacement of pilot with a set of mechanical actuators (22).

The drone aircraft response is recorded on a video camera (26) mounted at eye level in the cockpit (12) of the air vehicle (11). The video camera (26) is focused on essentially aircraft attitude and performance instruments (13). These aircraft attitude and performance instruments (not shown), as in normal aircraft operations, indicate aircraft performance. The video images of the aircraft attitude and performance information is then captured and the corresponding signals (28) are telemetered to the ground station (30) rather than digital telemetered readings from the instruments (13) themselves. The above mentioned video images are transmitted to the ground station (30) via standard video telemetry techniques.

It is important to note that because of washout problems caused by the sun in certain air vehicle orientations, the air vehicle (11) preferably has a fully darkened cockpit (12). To that end, the aircraft canopy (16) is preferably covered with a light blocking material or fabric. This fabric is a light blocking material typically used on nuclear flash blindness curtains and is used to screen out any exterior sunlight. The instruments on the aircraft or air vehicle (11), and instrument (13) lighting, should preferably be run at maximum intensity to maximize the video picture quality.

A second video camera (27) which records and transmits takeoff and landing video images is also used. This second video camera (27) is also disposed in the cockpit (12) of the air vehicle (11). These second video signals (29) record information present exterior of the cockpit (12). It is impractical to use a single camera for both the interior pictures as well as the takeoff and landing visual pictures, due to the visual distortion caused by a fixed camera viewing both the interior instrument panel and the exterior environment. Like, the first video signal (28), the second video signal (29) is also transmitted to the ground station (30) via standard video telemetry techniques.

In the preferred embodiment, the air vehicle (11) attitude and performance information is presented to the remote pilot or operator (39) via telemetered video signals (28). The aircraft instrument panel video signal is presented on a high resolution screen (34) in the same position as an instrument panel in an aircraft or other simulator. Please see FIG. 4 and FIG. 5. The takeoff and landing video signal (29) is presented on a separate high resolution screen (33) mounted above the instrument panel presentation. This configuration closely duplicates the actual arrangement and visual scene presented to an on board pilot, and minimizes the requirement for any habit or pattern changes. While seated in the ground station (30), the operator (39) makes the appropriate flight control movements using the support equipment (32). These control movements include controlling of the support equipment (32) representing the rudders, breaks, throttle, flaps, and landing gear. These controls placements are measured and encoded digitally.

Referring back to FIG. 2 and FIG. 3, the control displacement information of the support equipment (32) is transmitted from the ground station (30) to the air vehicle via standard telemetry techniques. A receiver located on the air vehicle (11) is adapted for receiving the flight command signal (35). As the flight command signal (35) is received, it is processed with an actuator control system (24) in order to engage and control the mechanical actuators (22). The processed information is then used to control the mechanical actuators (22) which in turn operate the control equipment (14). The operation of the control equipment (14) is done so as to exactly replicate the control displacements of the support equipment (32) at the ground station (30). Actual control movements in the cockpit (12) of the air vehicle (11) are accomplished via the mechanical actuators (22) functioning in the same way as the pilot using his arms and legs. These movements of the control equipment (14) in the cockpit (12) result in actual air vehicle (11) or aircraft responses. The aircraft response and handling characteristic are exactly the same as in standard aircraft configuration because no structural modifications were necessary to operate this drone control system (10). The only change has been the replacement of the pilot with a set of mechanical actuators (22).

The receiver, transmitters, mechanical actuators (22), and video camera (26) in the air vehicle (11) are mounted on a series of platforms (20) which physically simulates the aircraft ejection seat and placed in a location where the pilot typically would sit. The mechanical actuators (22) are operatively connected to the appropriate control equipment (14) to provide the positive control of the air vehicle (11).

Figure 6:
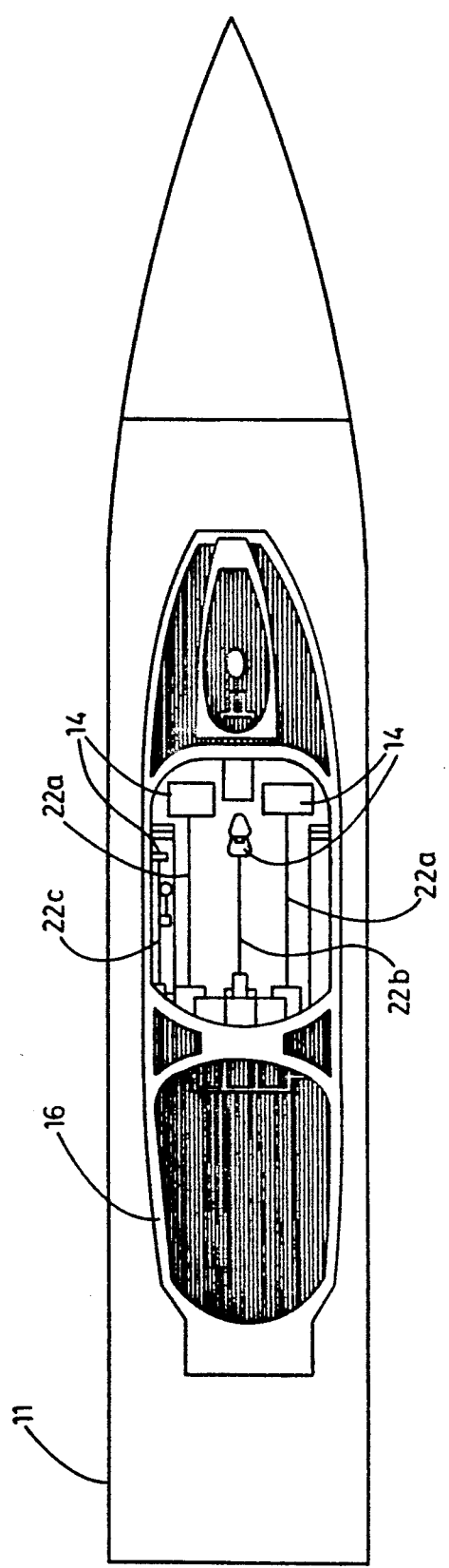
FIG. 6 illustrates a top view of the aircraft cockpit, the control equipment and the plurality of actuators of the present invention.

Applied to a F-4 Phantom II aircraft, the disclosed Drone Control System (10) would involve modifications to the ejection seat assembly, the canopy (16), and installation of two video cameras (26,27). In the preferred embodiment, the ejection seat assembly would be removed from the air vehicle (11). As seen in FIG. 1, FIG. 3, and FIG. 6, the ejection seat itself would then be removed from the roller assembly. A series of platforms (20) are installed, replacing the ejection seat. These platforms are installed on the roller assembly so that the platforms (20) are in approximately the same vertical position as a pilot's arms and legs when the roller assembly is re-introduced to the air vehicle (11). Multiple mechanical actuators (22) are mounted or attached to these platforms (20). In the preferred embodiment, four platforms (20) are used. The lower platform (20a) is located approximately where a pilot's legs would reside if a pilot were on the aircraft. A second platform (20b) is located approximately at the control stick level. The third platform (20c) is installed at a height approximately equal to that of a pilot's arm height so as to control the throttle. The fourth platform (20d) is installed at approximately eye level.

On the lower platform (20a), four linear actuators (22a) are attached. Upon installation into the aircraft, two of these four actuators (22a) are operatively connected to the center of the rudder pedals to allow for the actuation of the aircraft rudder. The remaining two linear actuators (22a) on the lower platform (20a) are operatively connected to the top of each rudder so as to actuate the aircraft brakes.

Two additional linear actuators (22b) are mounted on the second platform (20b). Once installed, the platform (20b) and actuators (22b) are located proximate the aircraft control stick. One linear actuator (22b) is operatively connected to the control stick in the 'Z' axis to move the stick laterally in the roll axis. A second linear actuator (22b) would be mounted on the same second platform and adapted to move the control stick in the pitch axis to control the aircraft pitch.

Three linear actuators (22c) are attached to the third platform (20c). The platform (20c) and actuators (22c) are located approximately at a pilot's arm height. One of these actuators (22c) is operatively connected to the aircraft throttles. The remaining two actuators (22c) are smaller linear actuators and are operatively connected to the speed brake and the flaps control switch respectively.

Also mounted on the roller assembly is the actuator control system (24) and the means for communication between the air vehicle (11) and the ground station (30). As discussed above, this means for communication typically employs one or more transmitters and one or more receivers as well as a signal processor or similar electronic device. Such devices would be mounted on a fourth platform (20d). The command and control signals could be routed through existing aircraft antennas. Alternatively, it is possible to install a new antenna to handle the command and control signals for the newly converted drone.

Finally, a high resolution video camera (26) is installed at eye height. In the preferred embodiment, this camera (26) is also mounted on the roller assembly, which is now the modified ejection seat. The modified ejection seat assembly, complete with all platforms (20), actuators (22), camera (26), and electronic equipment is re-introduced into the air vehicle (11). The actuators (22) are then operatively connected to the control equipment (14) to which they will control, as discussed above. After installation on the aircraft, the high resolution video camera (26) is focused on the cockpit instruments (13) approximately at the center of the aircraft control panel.

The canopy (16) in the preferred embodiment, is lined with a close fitting, high density cloth material to block all possible light from outside the aircraft from entering the cockpit (12). The lighting for the aircraft instruments (13) is turned to maximum intensity to increase the video camera picture resolution. A second video camera (27) is installed in the cockpit (12) which essentially replaces the Heads Up Display. This second video camera (27) provides video images from outside the aircraft for take-off and landing. This second video camera (27) also presents aircraft attitude information during flight.

The ground station (30) comprises a replicated cockpit having support equipment (32) identical to the control equipment (14) in the cockpit (12) of the F-4 Phantom II. The ground station (30) is adapted to accommodate an operator (39) or pilot to command the drone. The ground station (30) further comprises a high resolution screen (33) to display visual images obtained from the first video cameras (26) within the cockpit. Likewise, a second display screen (34) is located in the ground station to display the images received from the second video camera (27).

Further, one or more receivers and transmitters together with the necessary data processors are located at the ground station (30) and adapted for receiving, transmitting, and processing the information between the replicated cockpit in the ground station (30) and the cockpit (12) in the air vehicle (11). In the preferred embodiment, control movements at the ground station (30) are translated from analog displacements to digital flight command signals (35) and telemetered to the air vehicle. The telemetry flight command signals (35) are then used to operate the linear actuators (22) in the cockpit (12) thereby remotely piloting the air vehicle (11).

While a specific embodiment has been shown and described, many variations are possible. Additional features such as encoding devices or additional processors may be employed. The particular shape or configuration of the platform, ground station, the type of actuators used, and the interior configuration of the cockpit may be changed to suit the system or equipment with which it is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

What we now claim as the invention is:

1. A method for remotely controlling an air vehicle comprising the steps of:
    installing a plurality of platforms in a cockpit of the air vehicle proximate control equipment, the control equipment on the air vehicle is adapted for governing the operation of the air vehicle;
    attaching a plurality of actuators to the platforms and operatively connected to the control equipment;
    constructing a ground station remotely located from the air vehicle, the ground station comprising support equipment similar to the control equipment on the air vehicle, the ground station is further adapted for generating flight command signals corresponding to the displacement and orientation of the support equipment;
    installing an actuator control system in the cockpit of the air vehicle and in operative connection with the plurality of actuators;
    installing a first video camera in the cockpit such that signals corresponding to video image of the interior of the cockpit are recorded;
    installing a second video camera in the cockpit such that signals corresponding to video images of conditions external of the cockpit are recorded;
    placing a darkened canopy over the cockpit such that external light is prevented from entering the cockpit;
    turning cockpit instrument lighting to maximum intensity to increase the first video camera picture resolution;
    generating flight command signals at the ground station from the operation of the support equipment;
    repeatedly transferring the flight command signals generated at the ground station to the actuator control system on the air vehicle so that the displacement and orientation of the control equipment on the air vehicle match the displacement and orientation of the support equipment at the ground station; and
    repeatedly transfer the video image signals recorded by the first and second cameras to the ground station.

2. The method for remotely controlling an air vehicle of claim 1 wherein the step of repeatedly transferring flight command signals further comprise:
    collecting displacement and orientation information of the support equipment at the ground station;
    telemetering the collected displacement and orientation information to the actuator control system;
    process the telemetered displacement and orientation information with the actuator control system;
    operatively engaging the plurality of actuators whereby the displacement and orientation of the control equipment on the air vehicle match the displacement and orientation of the support equipment at the ground station; and
    repeating the aforementioned four steps.

3. The method for remotely controlling an air vehicle of claim 1 wherein the step of repeatedly transferring the video image signals recorded by the first and second cameras to the ground station further comprise:
    collecting the recorded video image signals from the first and second video cameras on the air vehicle;
    telemetering the collected video image signals to the ground station;
    processing the telemetered video image signals at the ground station;
    displaying the processed video image signals on high resolution screens at the ground station; and
    repeating the aforementioned four steps.

4. A drone control system comprising:
    an operable air vehicle having a cockpit which houses a plurality of control equipment for governing the operation of the air vehicle;
    a darkened canopy covering the cockpit such that external light is prevented from entering the cockpit;
    a platform means disposed in the cockpit;
    a means for operating the control equipment disposed on the platform means;
    a ground station remotely located from the air vehicle, the ground station comprising a plurality of support equipment similar to the plurality of control equipment in the cockpit, the ground station is further adapted for generating
    flight command signals corresponding to the displacement and orientation of the plurality of support equipment;

a first video camera disposed on the platform means such that a sinal corresponding to video images of the interior of the cockpit are recorded and transmitted to the ground station;

a second video camera disposed in the air vehicle such that a signal corresponding to video images of conditions external of the cockpit are recorded and transmitted to the ground station;

a means for receiving and displaying the video image signals transmitted from the air vehicle, the means for receiving and displaying disposed in the ground station; and a means to transfer the flight command signals generated at the ground station to the air vehicle so that the means for operating the control equipment changes the displacement and orientation of the plurality of control equipment on the air vehicle to match the displacement and orientation of the plurality of support equipment at the ground station.

5. The drone control system of claim 4 wherein the means for operating the control equipment further comprises:

a plurality of actuators disposed on the platform means and operatively connected to the plurality of control equipment in the cockpit; and an actuator control system disposed in the cockpit and operatively connected to the plurality of actuators.

6. The drone control system of claim 5 wherein the plurality of actuators are linear actuators.

7. The drone control system of claim 4 wherein the platform means further comprises a plurality of platforms disposed proximate the plurality of control equipment.

* * * * *